Jan. 20, 1948. R. J. WELSH 2,434,777
POWER PLANT COMPRISING A GAS TURBINE AND AN INTERNAL-COMBUSTION
ENGINE COMPRESSOR SERVING AS A GAS GENERATOR THERETO
Filed Dec. 3, 1943 3 Sheets-Sheet 3

Patented Jan. 20, 1948

2,434,777

UNITED STATES PATENT OFFICE 2,434,777

POWER PLANT COMPRISING A GAS TURBINE AND AN INTERNAL-COMBUSTION ENGINE COMPRESSOR SERVING AS A GAS GENERATOR THERETO

Robert James Welsh, Rugby, England, assignor to The English Electric Company Limited, London, England, a British company Application December 3, 1943, Serial No. 512,836
In Great Britain September 30, 1942

1 Claim. (Cl. 60—13)

This invention relates to a free-piston type compression-ignition internal combustion engine driven compressor—i. e. a device wherein a compressor piston is directly connected to or combined with an internal combustion engine piston instead of being driven thereby through connecting rods, cranks, crankshafts—used as a gas generator to supply to a prime mover (e. g. a gas turbine), as motive fluid, the exhaust from the engine cylinder (comprising the products of the combustion in the engine cylinder mixed with charging or scavenging air supplied to the engine by the compressor) with or without the admixture of air coming direct from the compressor.

According to the invention the exhaust gas, or at least some of the exhaust gas, from the prime mover is used—at least during operation at a light load—to heat the air drawn into the inlet to the compressor, thereby increasing the general cyclic temperature at low loads and tending, under these conditions, to prevent formation of inflammable deposits on parts of the system. Under any given set of conditions an increase in inlet temperature reduces the mass of gas drawn into the compressor cylinder at each suction stroke and therefore reduces the possible power output of the whole plant, which does not matter at light load; the invention permits the gas generator to operate over a wider range of powers than would otherwise be possible.

Means are preferably provided for deflecting the exhaust gases from the prime mover, or part of these gases, from the discharge outlet to the compressor inlet when the output of the plant falls below a predetermined value. Since the output is determined by the quantity of fuel supplied to the internal combustion engine cylinder per cycle, such deflecting means may be controlled by a member moving with the fuel regulator so as to be brought into action when the fuel supply per cycle falls below a predetermined minimum.

The exhaust gases, or a part of these gases, may be deflected so that they re-enter the system with the air drawn into the compressor, thereby heating the air by mixing with it either before or after reaching the compressor cylinder, this being simpler than passing the exhaust gases through a heat exchanger to heat the inlet air.

Figure 1:
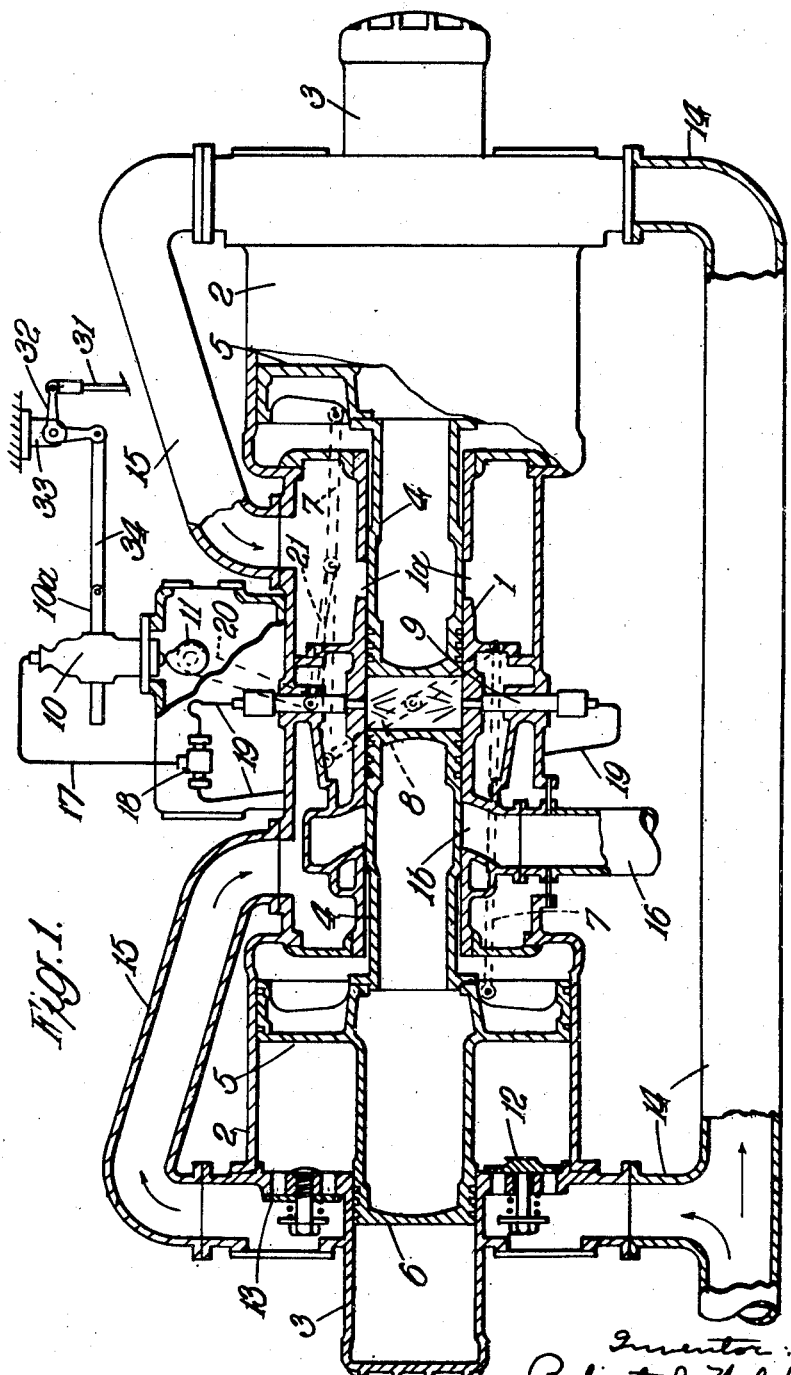
Figure 2:
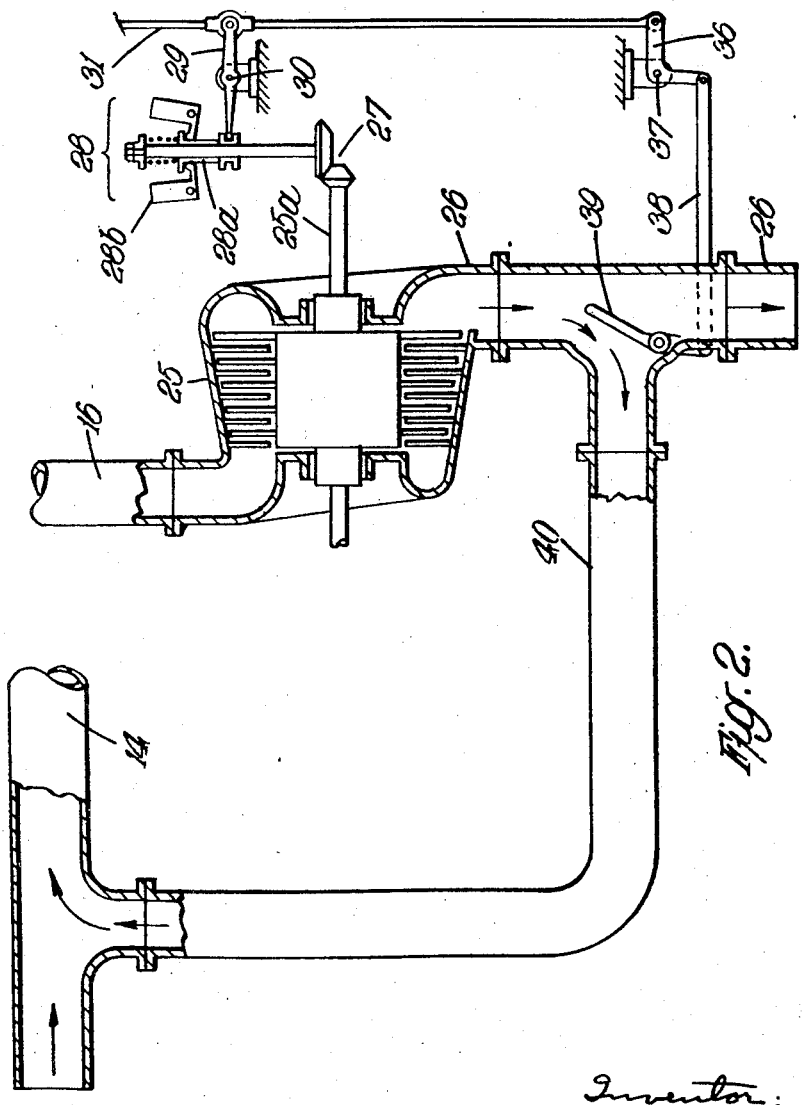
Figure 3:
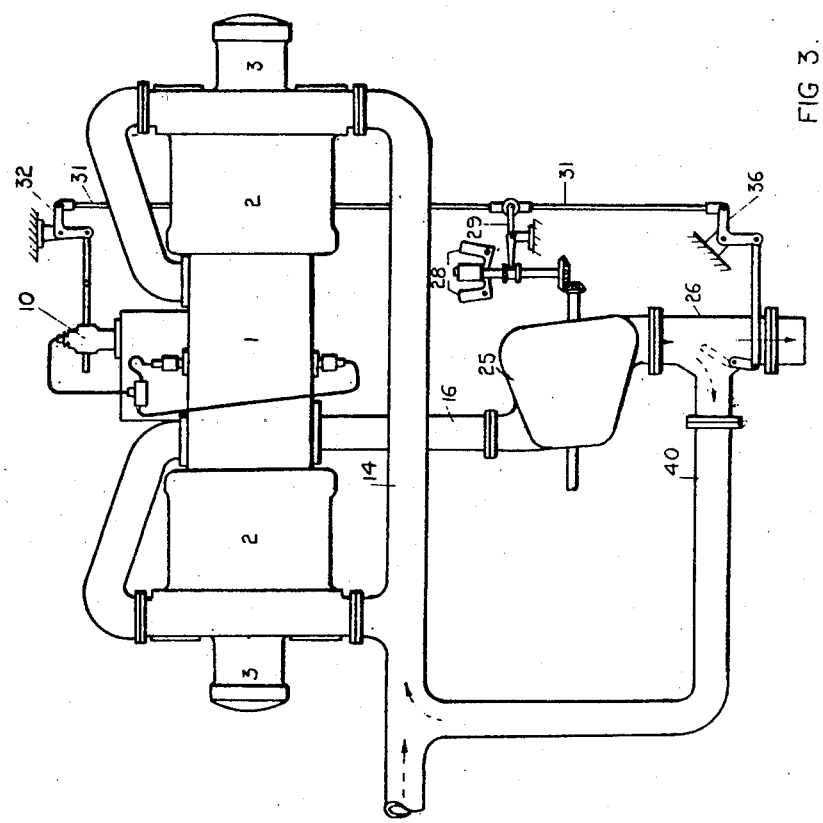

A plant including two opposed pistons reciprocable toward and away from each other in one cylinder, the engine operating on a two-stroke cycle, and incorporating the invention, is shown in the accompanying drawings, Figures 1, 2 and 3, of which Figure 1 shows the gas generator in axial section while Figure 2 shows the turbine and governor partly in axial section; these two figures taken together constitute a single drawing of the whole plant, the conduits 14 and 16 and the link 31 of Figure 1 being connected to the similarly marked part of Figure 2. Figure 3 shows the whole plant in a single figure to a reduced scale and in external view.

The body of the internal combustion compressor comprises the engine cylinder 1, the pair of compressor cylinders 2 at opposite ends thereof and the pair of buffer cylinders 3 at the extreme outer ends, while each free piston unit consists of one of the opposed engine pistons 4 reciprocating within the engine cylinder 1, a compressor piston 5 reciprocating in one of the cylinders 2 and a buffer piston 6 reciprocating in one of the cylinders 3. In the head of each of the compressor cylinders 2 is at least one inlet valve 12 which can put the cylinder 2 in communication with the inlet conduit 14 and at least one discharge valve 13 which can put the compressor cylinder 2 in communication with the conduits 15 communicating with the annular space surrounding the ring of inlet ports 1a in the engine cylinder 1. The latter is provided also with a ring of exhaust ports 1b opening into an annular space with which communicates the exhaust pipe 16.

The reciprocating piston units are synchronised in the well known and usual manner by being linked by the pair of links 7 to opposite ends of the lever 8 having its mid point pivotally supported on the outside part of the engine cylinder 1.

Fuel can be injected into the cylinder 1 by fuel injectors 9 of conventional form supplied in usual manner through fuel pipe 17, the usual form of distributor 18 and the fuel pipes 19, by the fuel injection pump 10 of conventional form reciprocated by cam 11 which is oscillated (in accordance with the movement of the free piston units) by the lever 20 which is connected by link 21 to a point on one of the links 7; the quantity of fuel injected by each stroke of the injection pump 10 is determined in the usual manner by the position of its fuel rack 10a.

The conduit 16 connects the exhaust ports of engine cylinder 1 to the inlet to the turbine 25 which discharges through the exhaust pipe 26. The turbine shaft 25a drives—through gearing 27—a conventional form of centrifugal speed governor 28 the sleeve 28a of which latter acts through lever 29 turning on fixed pivot 30, link 31, lever 32 turning about fixed pivot 33 and link 34 to position the fuel rack 10a of the fuel injection pump 10 in accordance with the speed of the turbine so that in well known manner movement of governor weights 28b on an increase in turbine speed will act through movement of sleeve 28a, lever 29, link 31, lever 32, link 34 and fuel racks 10a to decrease the quantity of fuel injected, while such movement on decrease in turbine speed will increase the quantity of fuel injected.

The power plant so far described is of well-known kind and operates in the following well-known manner:

When the free piston units approach the inner dead centre position as shown in Fig. 1, air is compressed in the engine cylinder 1 between the pistons 4 to a temperature at which injected fuel will ignite while the cam 11 operates the fuel pump 10 to inject into this compressed air (through the injection valves 9) a quantity of fuel which is determined by the position of the fuel rack 10a. During the outward stroke of pistons 4 and 5 following on the combustion of this fuel, the pistons 5 compress in the cylinders 2 the air previously drawn in through the inlet valves 12 which now close. When the free piston units come to rest at the end of this outward stroke, one of the pistons 4 uncovers the inlet ports 1a and the air compressed in the cylinders 2 goes through the non-return valves 13 as shown by the arrows through the conduits 15 to the inlet ports 1a so scavenging the engine cylinder. The other piston 4 has also uncovered the exhaust ports 1b so that the mixture of combustion products and scavenging air goes by way of conduit 16 to the inlet to the turbine 25 to serve as the motive fluid for this turbine and eventually is discharged by the turbine exhaust 26. The buffer pistons 6 during this outward stroke compress air in the buffer cylinders 3 until the piston units are brought to rest and when scavenging of the engine cylinder takes place the pressure in the buffer cylinders 3 causes the piston units to rebound and return to the inner dead centre position, thereby trapping and compressing in the engine cylinder 1 some of the scavenging air while at the same time the compressor pistons 5 draw into the cylinders 2 a fresh charge of air through the non-return inlet valves 12 from the inlet pipes 14. The operation so far described is well known and is described solely for the sake of completeness.

According to the invention a branch 40 from the turbine exhaust pipe 26 leads into the compressor inlet 14, so that at least some of the exhaust gas from the turbine is conveyed to where it can heat the air going into the compressor. The branch pipe 40 is controlled by valve 39.

The link 31 connecting the governor-actuated lever 29 (by way of lever 32 and link 34) with the fuel adjusting rack 10a also extends to the lever 36 which turns about fixed pivot 37 and is connected by link 38 to the diverter valve 39. As the link 31 moves to decrease the fuel injected, the valve 39 opens whereby some of the hot exhaust gas is deflected from the turbine exhaust pipe 26 and goes as shown by the arrows through branch pipe 40 to pipe 14 whence it is drawn with the incoming air—mixing with this air and raising its temperature—into the compressor cylinders 2 and thence, after compression, into the engine cylinder 1. Although this reduces the percentage oxygen content of the inlet air and hence of the charge entering the engine cylinder, such reduction is not so important at light load conditions and moreover under such conditions the percentage oxygen content in the exhaust gas is at a maximum and hence the dilution effect on the air entering the inlet is at a minimum.

What I claim as my invention and desire to secure by Letters Patent is:

A power plant comprising, in combination, a gas turbine, a free-piston type compression-ignition internal combustion engine driven compressor, a conduit connecting the exhaust gas and charging air outlet of the engine to the turbine inlet, a speed governor actuated by the turbine, a fuel supply regulator for the engine, a branched exhaust pipe from the turbine, one branch of this pipe leading into the compressor inlet, a diverter valve controlling said branch and means operatively connecting together said governor, said fuel regulator and said diverter valve in a sense to decrease the fuel supply on an increase in turbine speed and to divert turbine exhaust gas into the compressor at low values of fuel supply.

ROBERT JAMES WELSH.

REFERENCES CITED

The following references are of record in the file of this patent:

UNITED STATES PATENTS

| Number | Name | Date |
| --- | --- | --- |
| 1,652,122 | Horning | Dec. 6, 1927 |
| 1,816,345 | Secor | July 28, 1931 |
| 1,982,146 | Sloan | Nov. 27, 1934 |
| 2,147,935 | Steiner | Feb. 21, 1939 |
| 2,182,063 | Steiner | Dec. 5, 1939 |
| 2,303,794 | Pateras-Pescara | Dec. 1, 1942 |

FOREIGN PATENTS

| Number | Country | Date |
| --- | --- | --- |
| 12,735 | Great Britain | May 31, 1906 |
| 346,108 | Great Britain | Apr. 9, 1931 |